US012695008B2

(12) United States Patent
Zhang et al.

(10) Patent No.: US 12,695,008 B2
(45) Date of Patent: Jul. 28, 2026

(54) SURGE ARRESTER MODULE AND SURGE ARRESTER

(71) Applicant: Hitachi Energy Ltd, Zürich (CH)

(72) Inventors: Yun Zhang, Xiamen (CN); HuaJun Kang, Beijing (CN); LeJun Qi, Beijing (CN)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 19/128,336

(22) PCT Filed: Nov. 14, 2023

(86) PCT No.: PCT/EP2023/081724
§ 371 (c)(1),
(2) Date: May 8, 2025

(87) PCT Pub. No.: WO2024/105017
PCT Pub. Date: May 23, 2024

(65) Prior Publication Data

US 2026/0011471 A1 Jan. 8, 2026

(30) Foreign Application Priority Data

Nov. 14, 2022 (EP) .................................... 22207275

(51) Int. Cl.
*H02H 1/00* (2006.01)
*H01C 1/01* (2006.01)
*H01C 7/12* (2006.01)

(52) U.S. Cl.
CPC ................. *H01C 1/01* (2013.01); *H01C 7/12* (2013.01)

(58) Field of Classification Search
CPC ........................................................ H01C 1/01
See application file for complete search history.

(56) References Cited

U.S. PATENT DOCUMENTS 5,517,382 A 5/1996 Leupp et al.
5,757,604 A 5/1998 Bennett et al.
(Continued)

FOREIGN PATENT DOCUMENTS

CA 2456474 C 6/2013
CN 88100808 A 10/1988
(Continued)

OTHER PUBLICATIONS

International Search Report and Written Opinion, International Application No. PCT/EP2023/081724, mailed Mar. 6, 2024, 14 pages.

(Continued)

*Primary Examiner* — Stephen W Jackson
(74) *Attorney, Agent, or Firm* — Sage Patent Group

(57) ABSTRACT

The present disclosure provides a surge arrester module and a surge arrester including the surge arrester module. The surge arrester module includes a varistor stack, a pair of electrodes and a coupling assembly for coupling the pair of electrodes. The varistor stack includes multiple varistor blocks stacked along a longitudinal direction of the surge arrester module and is sandwiched the pair of electrodes. The coupling assembly includes at least one rod. Each rod includes a rod body extending in the longitudinal direction and at least one sleeve sleeved outside the rod body for attaching the rod to the electrode. The rod body is made of insulating material and includes a first interlocking portion in the form of a circumferential groove, wherein the groove lies within a plane having a normal vector parallel to the longitudinal direction.

8 Claims, 8 Drawing Sheets

(56) References Cited

U.S. PATENT DOCUMENTS

| | | | | |
|---|---|---|---|---|
| 5,936,826 | A | 8/1999 | Schmidt | |
| 8,009,402 | B2 | 8/2011 | Klaube | |
| 8,305,184 | B2 * | 11/2012 | Klaube | H01C 7/12 338/21 |
| 10,304,598 | B1 * | 5/2019 | Pusthay | H01C 7/12 |
| 11,177,058 | B2 * | 11/2021 | Kester | H01C 7/12 |
| 2005/0270719 | A1 | 12/2005 | Doser et al. | |
| 2008/0088406 | A1 * | 4/2008 | Klaube | H01C 7/12 338/21 |
| 2009/0225487 | A1 * | 9/2009 | Klaube | H01C 7/12 338/21 |
| 2010/0014206 | A1 | 1/2010 | Saito et al. | |
| 2017/0084368 | A1 | 3/2017 | Johansson et al. | |
| 2022/0013258 | A1 * | 1/2022 | Risi | H01C 7/12 |

FOREIGN PATENT DOCUMENTS

| | | | |
|---|---|---|---|
| CN | 102648501 | A | 8/2012 |
| CN | 103377783 | A | 10/2013 |
| CN | 106415741 | A | 2/2017 |
| CN | 106688055 | A | 5/2017 |
| CN | 207947133 | U | 10/2018 |
| CN | 109215908 | A | 1/2019 |
| CN | 110660545 | A | 1/2020 |
| CN | 107452455 | A | 3/2020 |
| CN | 111863361 | A | 10/2020 |
| DE | 102015007933 | B4 | 6/2017 |
| EP | 0280189 | A1 | 8/1988 |
| EP | 0810613 | A2 | 12/1997 |
| EP | 2382640 | A1 | 11/2017 |
| EP | 2382640 | B1 | 11/2017 |
| JP | H08115626 | A | 5/1996 |
| JP | 2002175905 | A | 6/2002 |
| JP | 2002260905 | A | 9/2002 |
| JP | 2002270405 | A | 9/2002 |
| JP | 3365088 | B2 | 1/2003 |
| JP | 2003297609 | A | 10/2003 |
| JP | 2003332108 | A | 11/2003 |
| JP | 2007281353 | A | 10/2007 |
| JP | 2013008728 | A | 1/2013 |
| JP | 6825663 | B1 | 2/2021 |
| KR | 20110082559 | A | 7/2011 |
| WO | 9607186 | A1 | 3/1996 |
| WO | 0115292 | A1 | 3/2001 |
| WO | 2013000781 | A1 | 1/2013 |

OTHER PUBLICATIONS

European Search Report, European Application No. 22207275.3, mailed Jan. 27, 2023, 13 pages.

Office Action and English translation, Chinese Patent Application No. 202380078693.3, mailed Jul. 23, 2025, 9 pages.

* cited by examiner

SURGE ARRESTER MODULE AND SURGE ARRESTER

CROSS REFERENCE TO RELATED APPLICATIONS

This application is a 35 U.S.C. § 371 national stage application of PCT International Application No. PCT/EP2023/081724 filed on Nov. 14, 2023, which in turn claims priority to European Patent Application No. 22207275.3, filed on Nov. 14, 2022, the disclosures and content of which are incorporated by reference herein in their entireties.

TECHNICAL FIELD

The present disclosure relates to a surge arrester module and a surge arrester including at least one surge arrester module.

BACKGROUND

Different types of surge arresters are today used in switchgears, such as gas-insulated switchgears, in order to protect power network equipment against incoming overvoltage. A surge arrester may be connected between a live wire and ground and may comprise a stack of varistor blocks of metal oxide, for instance zinc oxide, arranged between two electrodes. In a varistor block of metal oxide, the electrical resistance is high at low voltages but low at high voltages. When the voltage level in the live wire exceeds a critical value, the surge arrester will allow the electric current to be conducted to ground through the varistor blocks, whereby the overvoltage is reduced.

To carry large currents through a stack of varistor blocks and to give a surge arrester module of the surge arrester a good stability, a sufficient contact pressure must be maintained between the varistor blocks. The required contact pressure between the varistor blocks may be achieved by means of elongated clamping members of electrically insulating material which are connected to the electrodes and prestressed so as to press the electrodes towards each other in the axial direction of the surge arrester module and thereby achieve contact pressure between the varistor blocks. The clamping members may for instance have the form of endless loops, as shown in U.S. Pat. No. 5,517,382A, and US 20170084368A1, or rods/bars, as shown in EP0280189A1.

The insulating loops are generally formed by wet-winding process and may have internal defects, such as large delaminations, bubbles and voids. These internal defects may further cause partial discharges (PD) in the surge arrester. The insulating rods are generally formed by pultrusion process. Compared with the wet-winding process, the pultrusion process allows better control of quality, such that the insulating rods generally have less internal defects than insulating loops and are less likely to cause partial discharges.

As shown in EP0280189A1, the insulating rods are conventionally machined with external threads and connected to the electrodes by nuts. However, the strength of the external threads of the insulating rod is relatively low. The tensile test of such insulating rod shows that the teeth of the external threads break more easily than the rod body and are the weakest area of the insulating rod. Once the teeth of the insulating rod break, the prestressing force would be lost, which might result in an unacceptable loss of contact pressure between the varistor blocks and thus a functional failure of the surge arrester. In addition, even if the plastic teeth of the insulating rod would not break, there is possibility that the nuts may loosen due to, for example, creep of the teeth, which might also result in a functional failure of the surge arrester. And if glue is applied between nuts and plastic teeth, the plastic teeth are likely to break when the whole assembly need to be dismantled for maintenance.

Document EP 2 382 640 B1 relates an impedance assembly having a first armature body and a second armature body. An impedance body is arranged between the two armature bodies. The impedance body is braced between the armature bodies by means of a retaining element. The retaining element has a radially expanded section. The radially expanded section is limited by an expansion limitation element.

Document JP 3 365088 B2 aims to improve the fixing means of supporting spindles to supporting plates for collecting an element group inside a bushing in a lightning arrestor. The document describes that supporting plates are inserted in both the ends of plural supporting spindles arranged along the circumferences of stacked elements. Furthermore, stoppers are provided on the upper and lower sides of the supporting plates. Stoppers having a nearly cylindrical shape and a joint at one place in a circumferential direction, are used by inserting the stoppers in the supporting spindles, and then by applying a force in a radial direction such that the stopper is caulked by using a caulking jig having a projection.

Document JP 2002 260905 A describes a lightning arrestor which is less deformed by a torsional force and high in rigidity. In particular, the lightning arrestor is This lightning arrester is characterized in that an FRP rod is fixed to terminal electrodes while the terminal electrodes are compressed and the FRP rod is pulled.

Document DE 10 2015 007933 B4 provides a surge arrester with: at least one varistor block; and a spring element which is arranged in a stack together with the at least one varistor block; wherein the spring element comprises: a spring; and a locking means which in a first state holds the spring in a compressed position and in a second state releases the spring; and wherein the surge arrester comprises: an outer housing in which the at least one varistor block and the spring element are accommodated; and two end fittings which are attached to opposite ends of the outer housing and firmly connected thereto, and wherein at least one of the two end fittings having a gas outlet element.

SUMMARY

In view of the above, the present disclosure aims to provide a surge arrester module and a surge arrester including at least one surge arrester module that overcomes at least one of the above defects.

To this end, a first aspect of the present disclosure provides a surge arrester module comprising: a varistor stack comprising a plurality of varistor blocks stacked along a longitudinal direction of the surge arrester module; a pair of electrodes configured for sandwiching the varistor stack therebetween in the longitudinal direction, each electrode comprising at least one receiving hole; and a coupling assembly configured for coupling the pair of electrodes and holding the pair of electrodes and the varistor stack together, the coupling assembly comprising at least one rod. Each rod comprising: a rod body extending in the longitudinal direction and extending into the receiving holes of the pair of electrodes, the rod body being made of insulating material and comprising a first interlocking portion; and at least one sleeve being sleeved outside the rod body for attaching the rod to the electrode, the sleeve being made of metal and comprising a second interlocking portion, the second interlocking portion being adapted to fit with the first interlocking portion for preventing relative movement of the rod body and the sleeve in the longitudinal direction.

Another aspect of the present disclosure provides a surge arrester module comprising: a varistor stack comprising a plurality of varistor blocks stacked along a longitudinal direction of the surge arrester module; a pair of electrodes configured for sandwiching the varistor stack therebetween in the longitudinal direction, each electrode comprising at least one receiving hole; and a coupling assembly configured for coupling the pair of electrodes and holding the pair of electrodes and the varistor stack together, the coupling assembly comprising at least one rod, each rod comprising: a rod body extending in the longitudinal direction and extending into the receiving holes of the pair of electrodes, the rod body being made of insulating material and comprising a first interlocking portion in the form of a circumferential groove, wherein the groove lies within a plane having a normal vector parallel to the longitudinal direction; at least one sleeve being sleeved outside the rod body for attaching the rod to the electrode, the sleeve being made of metal and comprising a second interlocking portion, the second interlocking portion in the form of a circumferential protrusion being adapted to fit with the first interlocking portion for preventing relative movement of the rod body and the sleeve in the longitudinal direction, and wherein the coupling assembly further comprises at least one nut and wherein the sleeve is threadedly connected to the nut.

For the above surge arrester module, at least one rod is used to hold the electrodes and the varistor stack together. Compared to insulating loops, the insulating rods can be produced with a high production rate, low cost, and less internal defects (which can further reduce partial discharges of the surge arrester module). Besides, the at least one rod according to the present application is attached to the electrodes by means of sleeve(s) made of metal and fitting with the rod body, which would improve the strength of connection between the rod and the electrode and ensure the electrical contact pressure between varistor blocks and thus good functional reliability, compared to conventional rods.

According to an embodiment of the present disclosure, the sleeve is circumferentially crimped to the rod body, and circumferential part of the sleeve is deformed due to crimping to form the second interlocking portion.

According to an embodiment of the present disclosure, the first interlocking portion is in the form of a circumferential groove, and the second interlocking portion is in the form of a circumferential protrusion.

According to an embodiment of the present disclosure, the sleeve comprises at least one slot configured for allowing at least a part of the sleeve comprising the second interlocking portion to be elastically deformed in order to fit with the first interlocking portion.

According to an alternative embodiment of the present disclosure, the sleeve comprises a shoulder, and the receiving hole of the electrode comprises an abutting surface configured for abutting against the shoulder to prevent relative movement of the sleeve and the electrode towards each other in the longitudinal direction.

According to another alternative embodiment of the present disclosure, the receiving hole opens radially outward.

According to a further alternative embodiment of the present disclosure, the receiving hole of the electrode further comprises a limiting surface configured for abutting against the shoulder to prevent the sleeve from being slipped away from the electrode in a radial direction of the surge arrester module.

According to an embodiment of the present disclosure, the coupling assembly comprising at least one nut, and the sleeve is threadedly connected to the nut.

According to an embodiment of the present disclosure, the surge arrester module further comprises an electrical contact element for keeping contact pressure between the varistor blocks.

According to an embodiment of the present disclosure, the electrical contact element is in the form of a spring element, and the electrical contact element is arranged between the electrode and the varistor stack.

According to an embodiment of the present disclosure, the electrical contact element is in the form of a screw, and the electrical contact element is threadedly connected within a threaded hole in the electrode with an end of the electrical contact element abutting against the varistor stack.

According to an embodiment of the present disclosure, the coupling assembly comprises a plurality of rods arranged around the varistor stack.

A second aspect of the present disclosure provides a surge arrester including at least one surge arrester module according to the first aspect of the present disclosure and a housing accommodating the at least one surge arrester module.

The surge arrester module and the surge arrester according to the present disclosure can offer the benefits of low risk of partial discharges, good functional reliability, high production rate and low cost. And the surge arrester module and the surge arrester according to the present disclosure can be easily obtained by modifying conventional surge arrester module and surge arrester.

BRIEF DESCRIPTION OF THE DRAWINGS

Other features and advantages of the present disclosure will be better understood through the following embodiments described in detail with reference to the accompanying drawings, in which the same reference numerals indicate the same or similar components.

DETAILED DESCRIPTION

The implementation and usage of the embodiments are discussed in detail below. However, it should be understood that the specific embodiments discussed are merely intended to illustrate specific ways of implementing and using the present disclosure, and are not intended to limit the protection scope of the present disclosure.

Figure 1:
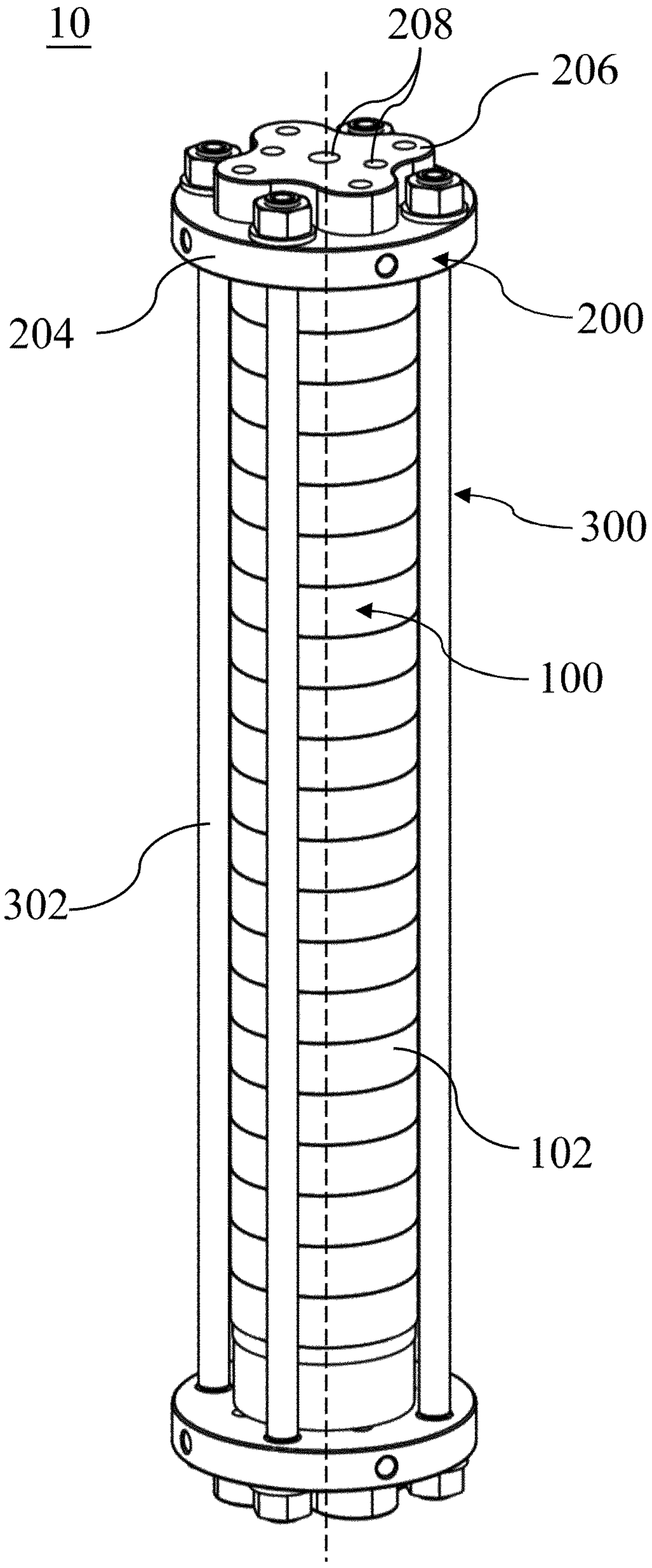
FIG. 1 is a perspective view of a surge arrester module according to a first embodiment of the present disclosure.
Figure 2A:
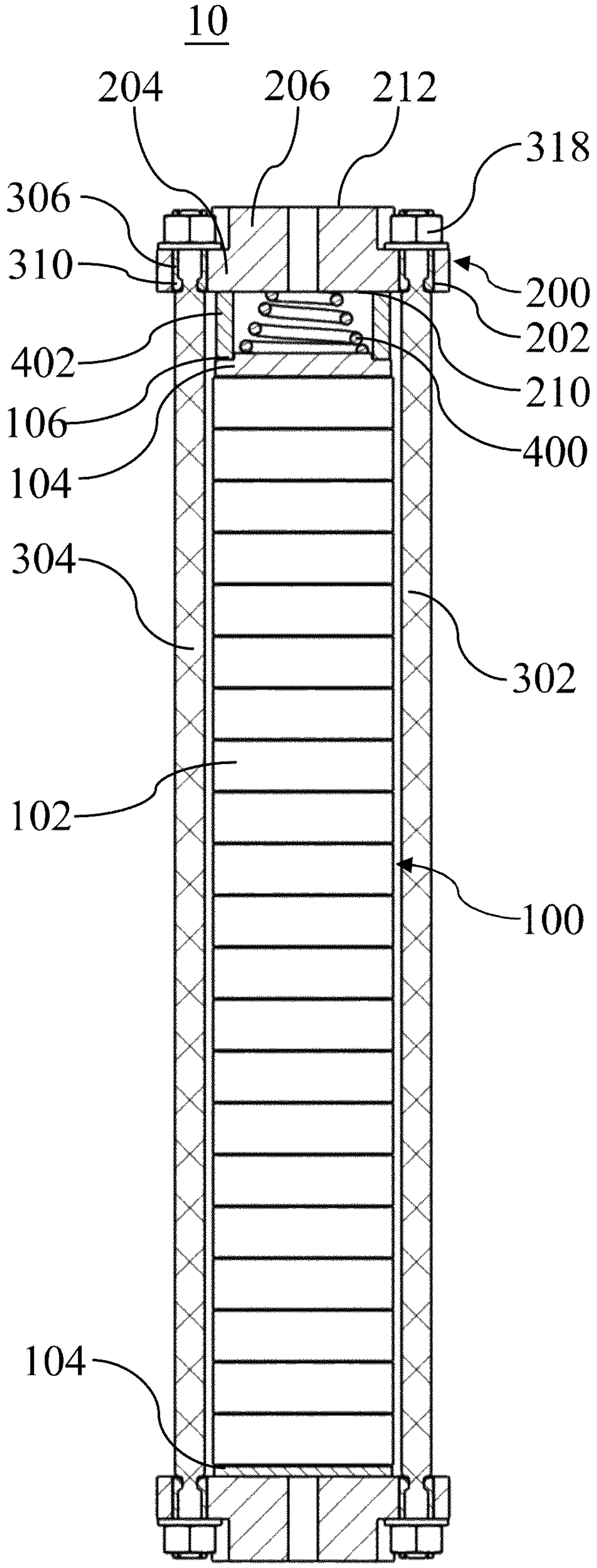
FIG. 2A is a cross-sectional view of the surge arrester module according to the first embodiment of the present disclosure.
Figure 2B:
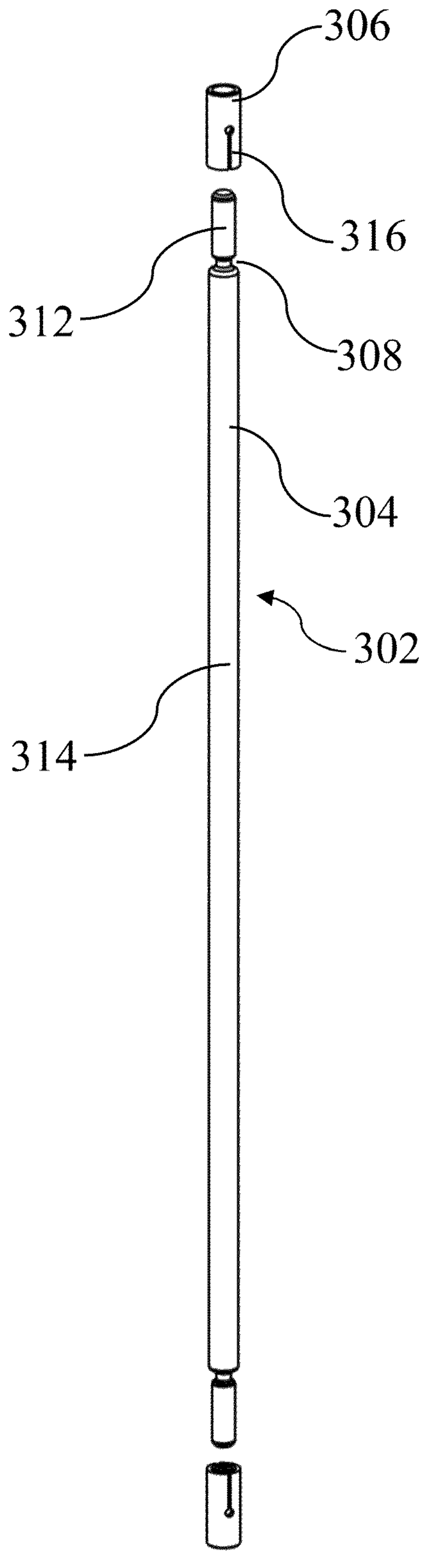
FIG. 2B is an exploded view of a rod of the surge arrester module according to the first embodiment of the present disclosure.

FIGS. 1-2B show a surge arrester module 10 and its components according to a first embodiment of the present disclosure.

As shown in FIGS. 1 and 2A, the surge arrester module 10 includes a varistor stack 100, a pair of electrodes 200 and a coupling assembly 300. The varistor stack 100 includes multiple varistor blocks 102 stacked along a longitudinal direction of the surge arrester module 10. The pair of electrodes 200 are configured for sandwiching the varistor stack 100 therebetween in the longitudinal direction of the surge arrester module 10. Each electrode 200 includes at least one receiving hole 202. The coupling assembly 300 is configured for coupling the pair of electrodes 200 and holding the pair of electrodes 200 and the varistor stack 100 together. The coupling assembly 300 includes at least one rod 302. Each rod 302 includes a rod body 304 and at least one sleeve 306. The rod body 304 extends in the longitudinal direction of the surge arrester module 10 and into the receiving holes 202 of the electrodes 200. The rod body 304 is made of insulating material and includes a first interlocking portion 308. The at least one sleeve 306 is sleeved outside the rod body 304 for attaching the rod 302 to the electrode 200. The sleeve 306 is made of metal and includes a second interlocking portion 310. The second interlocking portion 310 is adapted to fit with the first interlocking portion 308 for preventing relative movement of the rod body 304 and the sleeve 306 in the longitudinal direction of the surge arrester module 10.

For the above surge arrester module 10, at least one rod 302 is used to hold the electrodes 200 and the varistor stack 100 together. Compared to insulating loops, the insulating rods can be produced with a high production rate, low cost, and less internal defects (which can further reduce/avoid partial discharges of the surge arrester module). Besides, the at least one rod 302 is attached to the electrodes 200 by means of sleeve(s) 306 made of metal and fitting with the rod body 304, which would improve the strength of connection between the rod 302 and the electrode 200 and ensure the electrical contact pressure between varistor blocks and thus good functional reliability. This will be further explained hereinafter.

As shown in FIGS. 1 and 2A, the varistor stack 100 may include multiple substantially circular cylindrically shaped varistor blocks 102. The varistor blocks 102 may be made of metal-oxide based material, e.g., ZnO based material. The varistor blocks 102 may be arranged coaxially and stacked on top of each other along the longitudinal direction of the surge arrester module 10. In the illustrated embodiment, the varistor stack 100 includes twenty-one varistor blocks 102. It should be understood that the varistor stack 100 may include any other suitable number of varistor blocks 102.

The varistor stack 100 may also include one or more circular metal plates 104 of electrically conductive material, such as aluminum or any other suitable metal, to compensate the space between the varistor blocks 102, providing cushioning between the varistor blocks 102 and to mechanically reinforce the surge arrester module 10. As shown in FIG. 2A, two metal plates 104 are respectively arranged at opposite ends of the varistor stack 100 in the longitudinal direction of the surge arrester module 10. In some embodiments, the metal plates may also be arranged between the varistor blocks 102.

The pair of electrodes 200 are made of electrically conductive material, such as aluminum, cooper, or any other suitable metal. One of the electrodes 200 is to be electrically connected to a high-voltage potential or another surge arrester module, whereas the other of the electrodes 200 is to be electrically connected to earth potential or another surge arrester module. When the voltage applied to the surge arrester module 10 exceeds a critical value, a current can flow between the electrodes 200 via the varistor blocks 102 in the varistor stack 100.

In the illustrated embodiment, each electrode 200 may be substantially cylindrically shaped. Each electrode 200 includes a first portion 204 and a second portion 206 protruding from the first portion 204 in the longitudinal direction of the surge arrester module 10 and extending away from the varistor stack 100. The first portion 204 includes multiple receiving holes 202 for receiving the rods 302. The second portion 206 includes multiple fastening holes 208 for fastening the surge arrester module 10 to an adjacent surge arrester module or fastening a shield to the surge arrester module 10.

Each electrode 200 includes a first surface 210 and a second surface 212 which are opposite to each other in the longitudinal direction of the surge arrester module 10, with the first surface 210 facing the varistor stack 100. In the illustrated embodiment, the first surface 210 and the second surface 212 are planar and extend perpendicularly to the longitudinal direction of the surge arrester module 10. The planar first surface 210 and second surface 212 can provide a relatively large contact area for achieving good electrical contact.

In the illustrated embodiment, the pair of electrodes 200 have the same configuration. In another embodiments, the pair of electrodes 200 may have different configurations.

As shown in FIGS. 1 and 2A, the varistor stack 100 is arranged between the pair of electrodes 200 and the pair of electrodes 200 are coupled to each other by the coupling assembly 300, such that the electrodes 200 and the varistor stack 100 are held together in the longitudinal direction of the surge arrester module 10 and contact pressure between the varistor blocks 102 of the varistor stack 100 can be achieved.

The coupling assembly 300 includes multiple rods 302 arranged evenly spaced from each other around the periphery of the varistor stack 100. In the illustrated embodiment, the coupling assembly 300 includes four rods 302, as shown in FIG. 1. However, the coupling assembly 300 may include any other suitable number of rods 302, such as three, five or six rods 302.

As shown in FIG. 2B, in the illustrated embodiment, each rod 302 includes a rod body 304 and two sleeves 306. The rod body 304 may be made of insulating material, such as fiber-reinforced epoxy resin, by pultrusion process. The fiber-reinforced epoxy resin may be, for example, glass fiber-reinforced epoxy resin. The sleeve 306 may be made of metal, such as aluminum, steel or any other suitable metal.

In the illustrated embodiment, the rod body 304 includes two end portions 312 opposite to each other and a middle portion 314 extending between the two end portions 312. Each of the two sleeves 306 has a tubular shape. The two sleeves 306 are respectively sleeved outside the two end portions 312 of the rod body 304 for attaching the rod 302 to the pair of electrodes 200. In the illustrated embodiment, the sleeve 306 has an outer diameter substantially equal to the outer diameter of the middle portion 314 and has an inner diameter substantially equal to the outer diameter of the end portion 312.

As shown in FIGS. 2A and 2B, the first interlocking portion 308 of the rod body 304 is in the form of a circumferential groove, and the second interlocking portion 310 of the sleeve 306 is in the form of a circumferential protrusion protruding towards the interior of the sleeve 306.

In order to easily arrange the sleeve 306 outside the end portion 312 of the rod body 304 or insert the end portion 312 of the rod body 304 into the sleeve 306, the sleeve 306 is provided with at least one slot 316 for enabling at least a part of the sleeve 306 including the second interlocking portion 310 to be elastically deformed, to further allow the second interlocking portion 310 to fit with the first interlocking portion 308. When the end portion 312 of the rod body 304 is initially inserted into the sleeve 306 and the rod body 304 pushes the second interlocking portion 310 of the sleeve 306, the part of the sleeve 306 including the second interlocking portion 310 would be deformed radially outward. As the end portion 312 of the rod body 304 is further inserted into the sleeve 306 and the first interlocking portion 308 of the rod body 304 fits with the second interlocking portion 310 of the sleeve 306, this part of the sleeve 306 would move radially inward, and the sleeve 306 would return to its original shape and be anchored to the rod body 304.

In the illustrated embodiment, the first interlocking portion 308 substantially extends along the entire circumference of the rod body 304 and has an annular/circular shape. The second interlocking portion 310 substantially extends along the entire circumference of the sleeve 306 and has two substantially semi-circular sections.

In the illustrated embodiment, the first interlocking portion 308 is provided between the end portion 312 and the middle portion 314 of the rod body 304. In some embodiments, the depth of the first interlocking portion 308 (i.e., the depth of the circumferential groove 308) is preferably in a range from 0.5 mm to 5 mm, in order to reduce stress concentration at the interlocking position and allow the rod 302 to withstand a lager tensile force. In some embodiments, the sleeve 306 may be further fixed to the rod body 304 by an adhesive to strengthen the connection between the sleeve 306 and the rod body 304.

In the illustrated embodiment, the sleeve 306 includes two slots 316 extending longitudinally from one end of the sleeve 306 and penetrating through the wall of the sleeve 306. The two slots 316 are arranged symmetrically with respect to the axis of the sleeve 306. It should be understood that, in another embodiments, the sleeve 306 may also include any other suitable number of slots 316, such as three or four slots 316.

The coupling assembly 300 further includes at least one nut 318. As shown in FIGS. 1 and 2A, in the illustrated embodiment, the coupling assembly 300 includes multiple nuts 318. Each sleeve 306 is provided with external threads and threadedly connected to a corresponding nut 318. Specifically, two sleeves 306 of each rod 302 are threadedly connected to two nuts 318 for attaching the rod 302 to the pair of electrodes 200 and hold the electrodes 200 and the varistor stack 100 together. Since the sleeve 306 is made of metal, the teeth of the external threads of the sleeve 306 have enough strength, which allows the rod 302 to withstand a large tensile force, and enables the surge arrester module 10 to be assembled and disassembled many times without breaking the threaded connection and especially facilities the maintenance of the varistor stack 100 which needs to be dismantled for maintenance.

Figure 8:
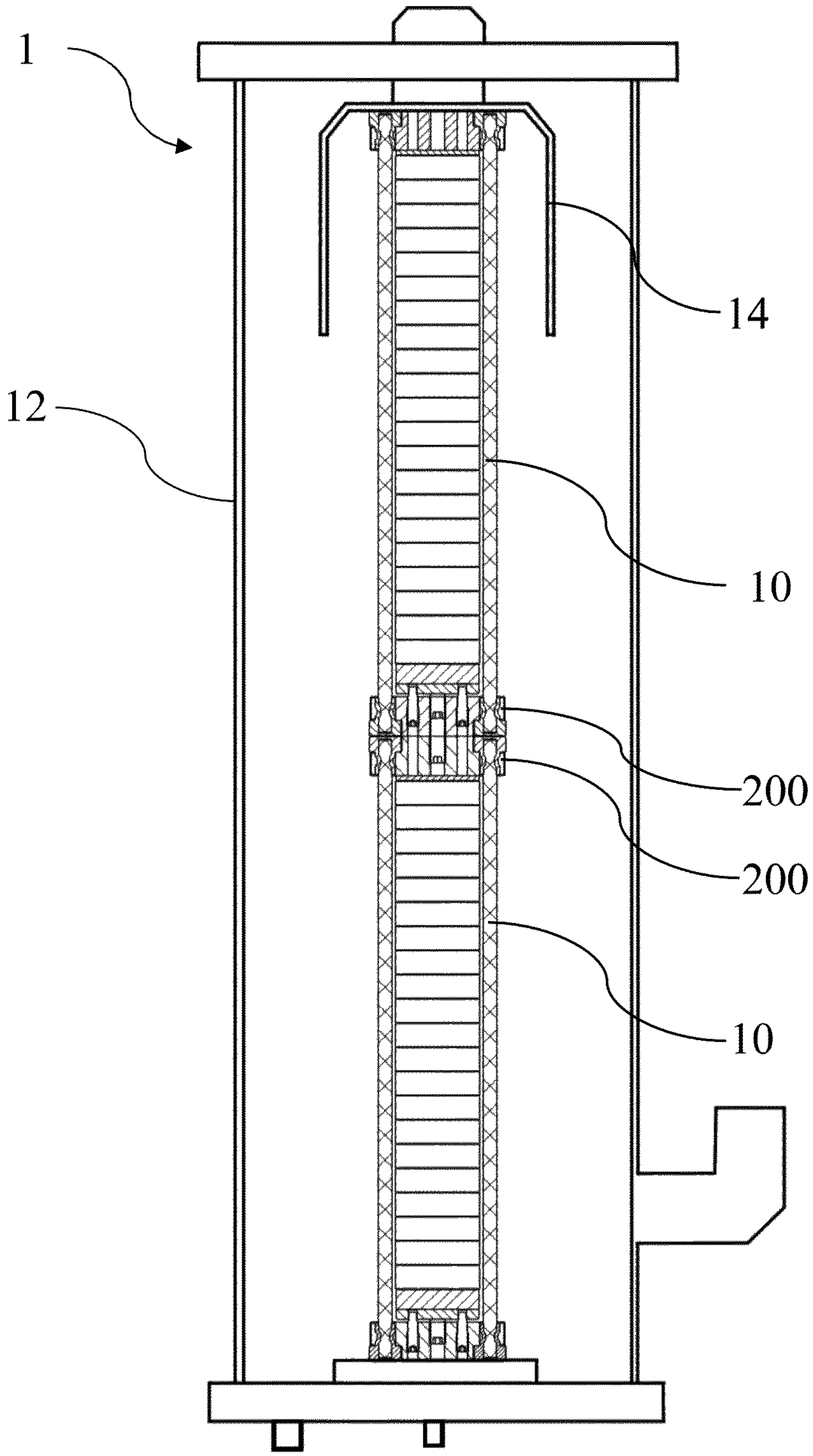
FIG. 8 is a schematic view of a surge arrester including the surge arrester modules of the third embodiment according to the present disclosure.

In the illustrated embodiment, the end portions 312 of the rods 302 and the nuts 318 threadedly connected to the rods 302 do not extend beyond the second surfaces 212 of the pair of the electrodes 200. This is particularly advantageous when two or more surge arrester modules 10 are connected in series in a way as shown in FIG. 8, since adjacent electrodes 200 of adjacent surge arrester modules 10 can contact each other, allowing the combination of the surge arrester modules 10 to be more compact.

As shown in FIG. 2A, the surge arrester module 10 may further include an electrical contact element 400 for keeping contact pressure between the varistor blocks 102. The electrical contact element 400 is made of electrically conductive material, such as steel, aluminum, and copper. In the illustrated embodiment, the electrical contact element 400 is in the form of a spring element. The electrical contact element 400 is arranged and compressed between the electrode 200 at the upper end of the surge arrester module 10 and the varistor stack 100.

In the illustrated embodiment, opposite ends of the electrical contact element 400 respectively abut against the first portion 204 of the electrode 200 and the metal plate 104 arranged at the upper end of the varistor stack 100. The electrical contact element 400 can press the varistor stack 100 and thus keep contact pressure between the varistor blocks 102.

As shown in FIG. 2A, in the illustrated embodiment, the surge arrester module 10 may further include a limiting sleeve 402. The electrical contact element 400 is arranged and confined inside the limiting sleeve 402, thereby preventing the displacement of the electrical contact element 400 and ensuring a stable electrical contact.

FIGS. 3A-4B show a surge arrester module 10 and its components as well as part of the manufacturing process of the surge arrester module 10 according to a second embodiment of the present disclosure. The surge arrester module according to the second embodiment and the surge arrester module according to the first embodiment are similar and the main differences therebetween is that the sleeve 306 of the rod 302 of the surge arrester module 10 according to the second embodiment is crimped to the rod body 304. The differences between the two embodiments will be described below, and the similarities therebetween will be omitted.

Figure 3A:
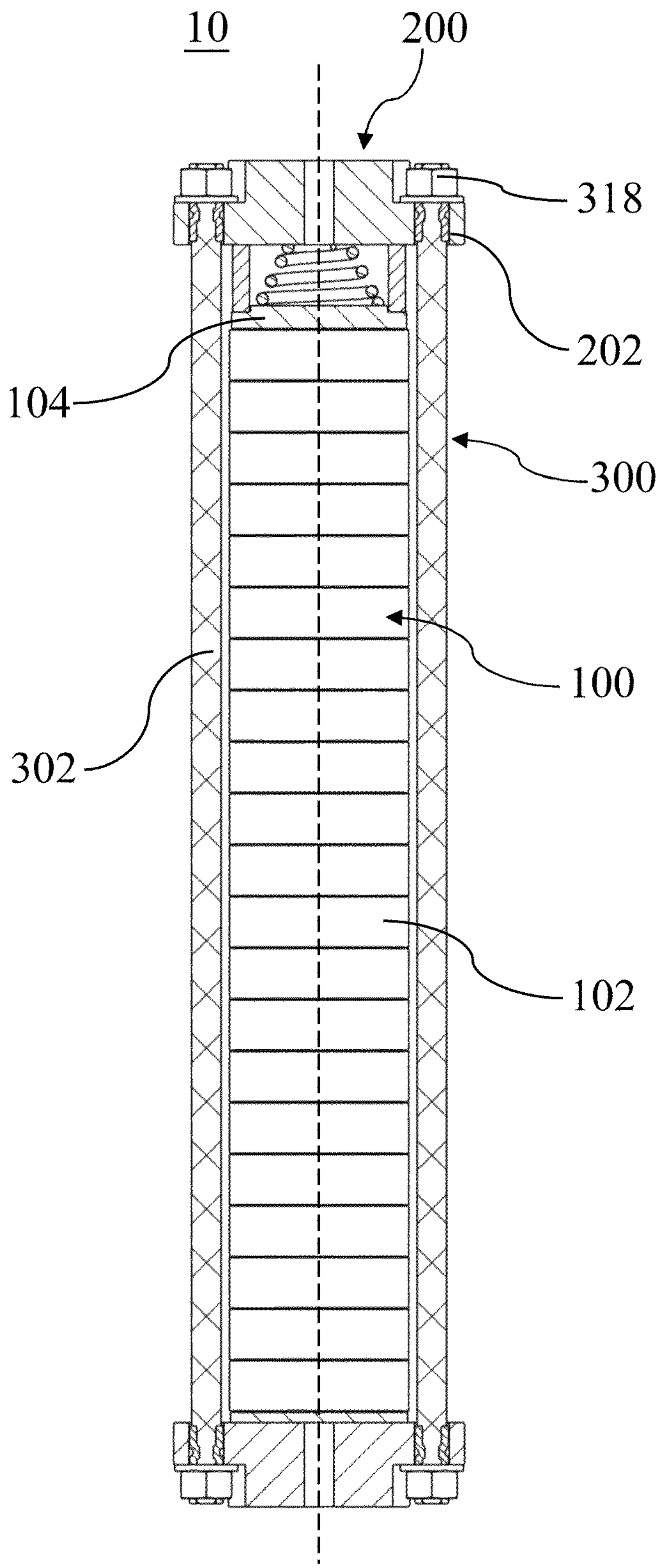
FIG. 3A is a cross-sectional view of a surge arrester module according to a second embodiment of the present disclosure.

As shown in FIG. 3A, the surge arrester module 10 according to the second embodiment includes a varistor stack 100, a pair of electrodes 200 and a coupling assembly 300. Each electrode 200 includes at least one receiving hole 202. The coupling assembly 300 includes at least one rod 302. Each rod 302 includes a rod body 304 and at least one sleeve 306. The rod body 304 extends in the longitudinal direction of the surge arrester module 10 and into the receiving holes 202 of the electrodes 200. The rod body 304 may be made of insulating material, such as fiber-reinforced epoxy resin, by pultrusion process. The sleeve 306 may be made of metal, such as aluminum, steel or any other suitable metal. The rod body 304 includes a first interlocking portion 308. The sleeve 306 includes a second interlocking portion 310. The second interlocking portion 310 is adapted to fit with the first interlocking portion 308 for preventing relative movement of the rod body 304 and the sleeve 306 in the longitudinal direction of the surge arrester module 10.

Figure 3B:
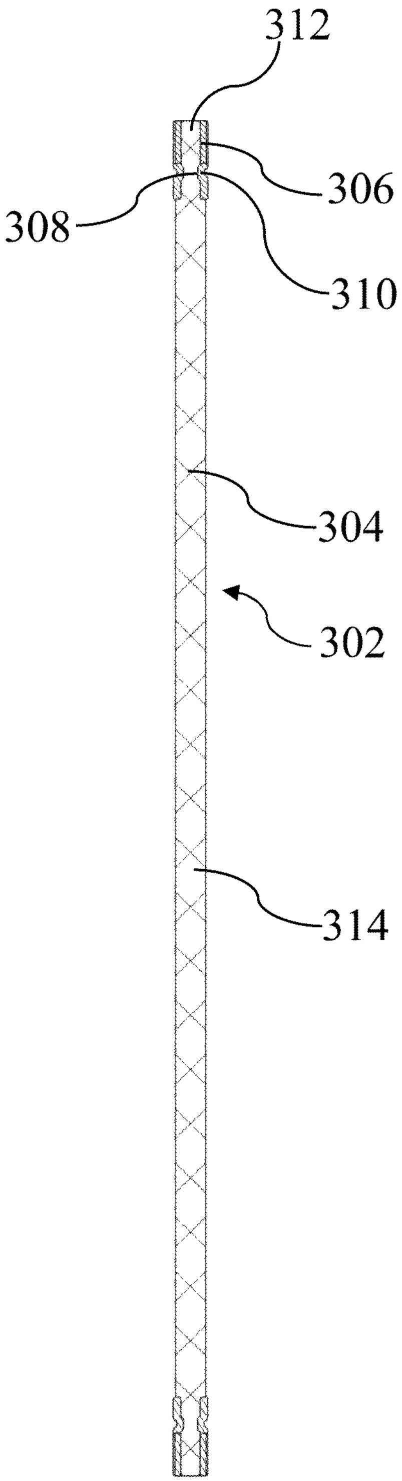
FIG. 3B is a cross-sectional view of a rod of the surge arrester module according to the second embodiment of the present disclosure.

As shown in FIG. 3B, in the illustrated embodiment, each rod 302 includes a rod body 304 and two sleeves 306. The two sleeves 306 are respectively sleeved outside two end portions 312 of the rod body 304 for attaching the rod 302 to the pair of electrodes 200.

The coupling assembly 300 further includes at least one nut 318. As shown in FIG. 3A, in the illustrated embodiment, the coupling assembly 300 includes multiple nuts 318. Each sleeve 306 is provided with external threads and threadedly connected to a corresponding nut 318. In the illustrated embodiment, two sleeves 306 of each rod 302 are respectively threadedly connected to two nuts 318 for attaching the rod 302 to the pair of electrodes 200 and hold the electrodes 200 and the varistor stack 100 together.

In the illustrated embodiment, the first interlocking portion 308 of the rod body 304 is in the form of a circumferential groove, and the second interlocking portion 310 of the sleeve 306 is in the form of a circumferential protrusion protruding towards the interior of the sleeve 306. In the illustrated embodiment, the first interlocking portion 308 substantially extends along the entire circumference of the rod body 304 and has an annular/circular shape. The second interlocking portion 310 substantially extends along the entire circumference of the sleeve 306 and has an annular/circular shape.

Each sleeve 306 is circumferentially crimped to the rod body 304, such that circumferential part(s) of the sleeve 306 is embedded into the first interlocking portion 308 and forms the second interlocking portion 310. Herein, "circumferentially crimped" means circumferential part(s) of the sleeve is pressed and deformed towards the rod body 304.

Figure 4A:
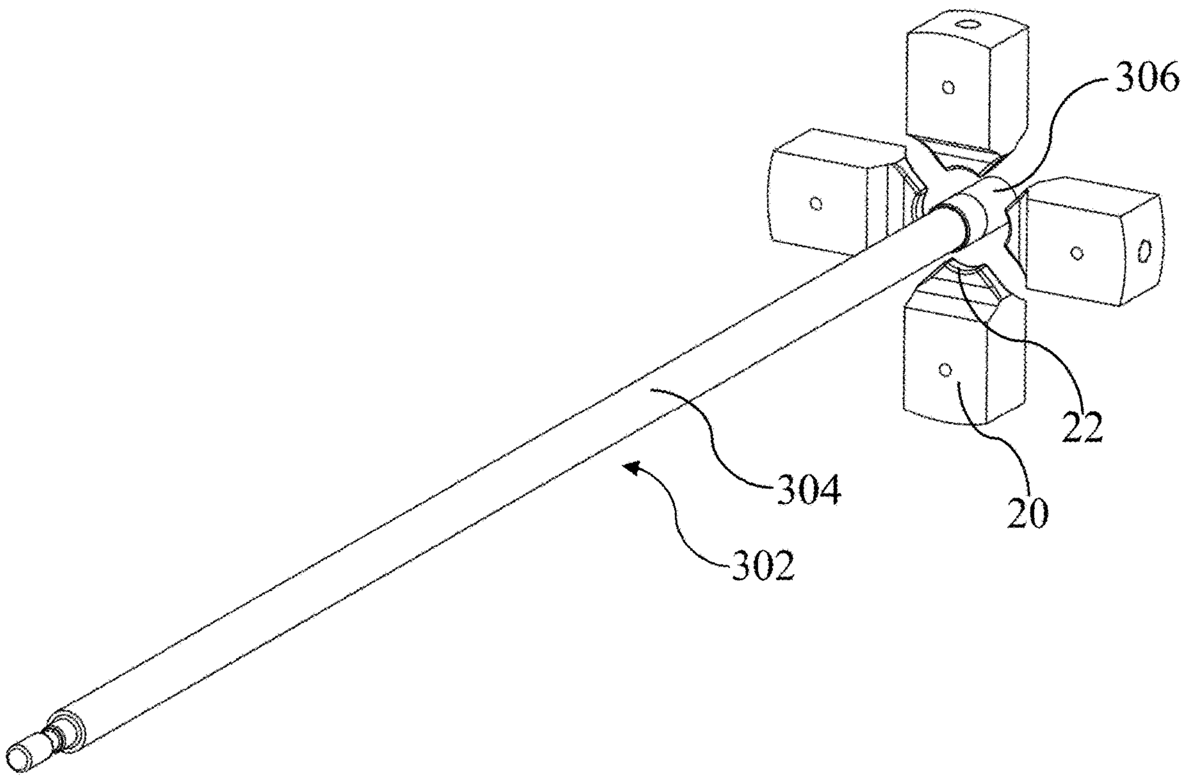
FIGS. 4A and 4B are different schematic views showing the process of crimping a sleeve to a rod body of the rod of the surge arrester module according to the second embodiment of the present disclosure, respectively.
Figure 4B:
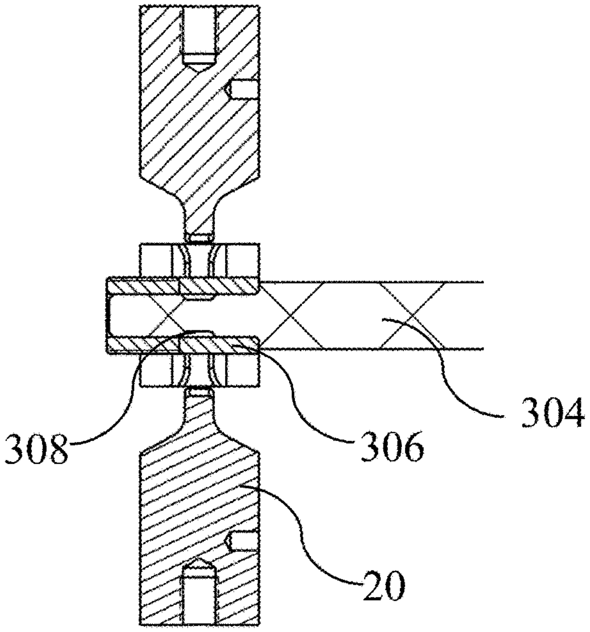

In the illustrated embodiment, each sleeve 306 is circumferentially crimped and secured to the rod body 304 by a crimping machine. As shown in FIGS. 4A and 4B, the crimping machine may include several crimping dies 20. The several crimping dies 20 are evenly spaced from each other around an axis of the rod 302. Each crimping die 20 includes an arc portion 22 facing the rod 302.

Before crimping the sleeve 306 to the rod body 304, the crimping dies 20 and/or the rod 302 are adjusted such that the arc portion 22 of each crimping die 20 is aligned with the first interlocking portion 308 of the rod body 304. Then, the crimping dies 20 are moved radially towards the sleeve 306 of the rod 302 and radially press part of the sleeve 306 into the first interlocking portion 308, and the crimping dies 20 are kept at the predetermined positions for a certain period, such that the second interlocking portion 310 of the sleeve 306 is formed while the second interlocking portion 310 fits with the first interlocking portion 308.

Circumferentially crimping part of the sleeve 306 into the first interlocking portion 308 of the rod body 304 allows a stronger connection between the sleeve 306 and the rod body 304 and allows the rod 302 to be evenly stressed when subjected to a tensile force, such that the rod 302 can withstand a lager tensile force.

In some embodiments, the depth of the first interlocking portion 308 (i.e., the depth of the circumferential groove 308) is preferably in a range from 0.5 mm to 5 mm, in order to reduce stress concentration at the interlocking position and allow the rod 302 to withstand a lager tensile force.

Figure 5:
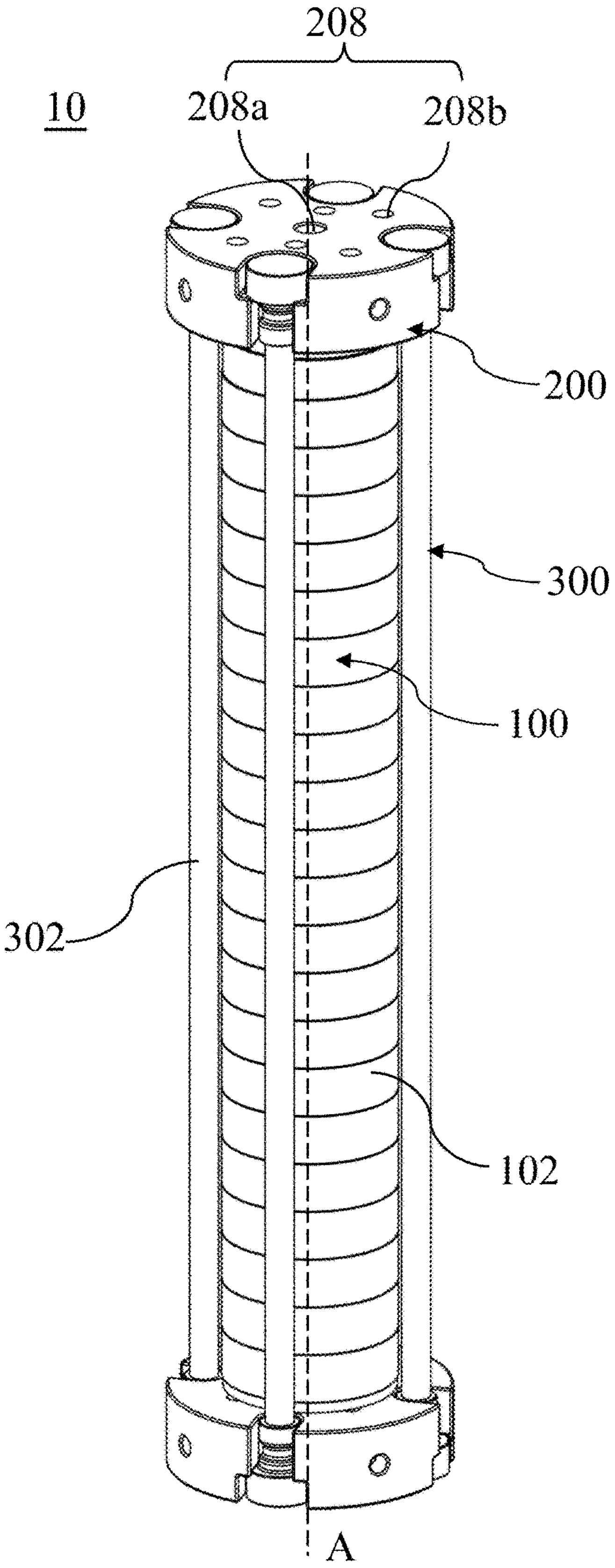
FIG. 5 is a perspective view of a surge arrester module according to a third embodiment of the present disclosure.
Figure 6A:
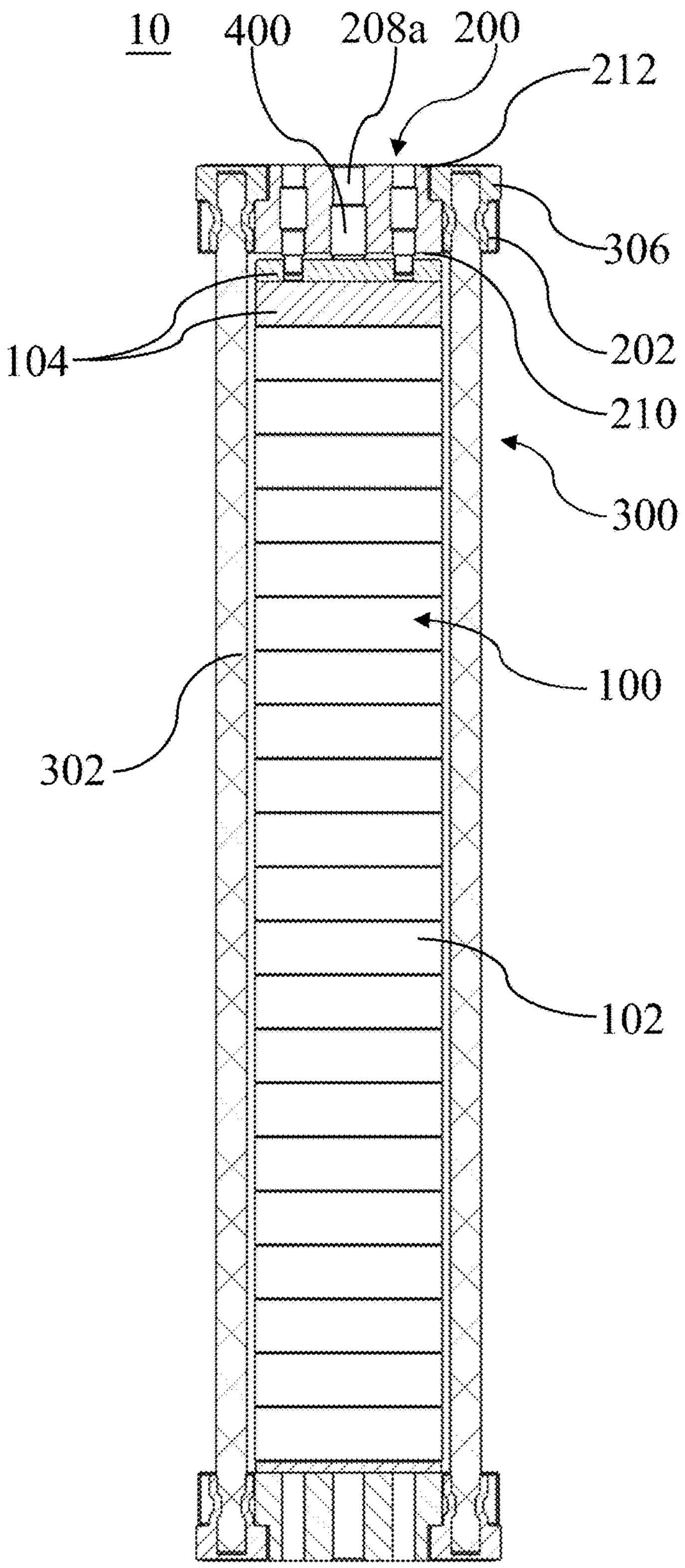
FIG. 6A is a cross-sectional view of the surge arrester module according to the third embodiment of the present disclosure.
Figure 6B:
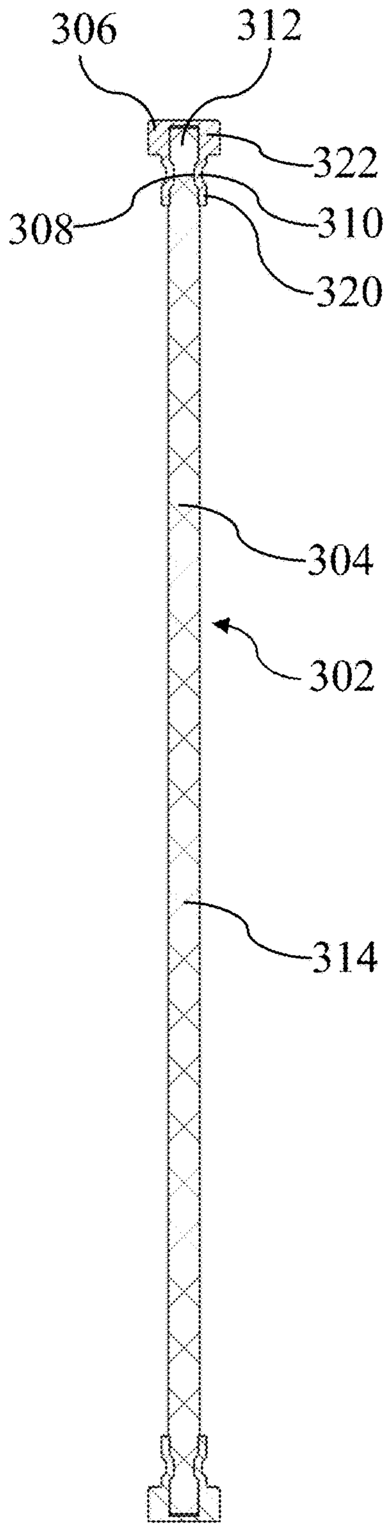
FIG. 6B is a cross-sectional view of a rod of the surge arrester module according to the third embodiment of the present disclosure.
Figure 7:
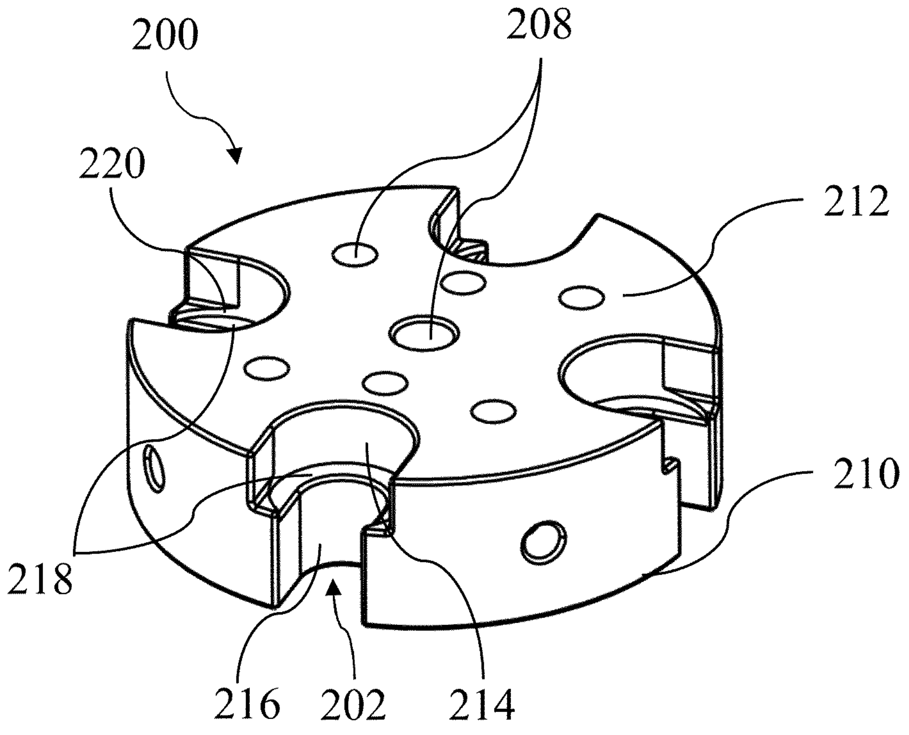
FIG. 7 is a perspective view of an electrode of the surge arrester module according to the third embodiment of the present disclosure.

FIGS. 5-7 show a surge arrester module 10 and its components according to a third embodiment of the present disclosure. The surge arrester module according to the third embodiment and the surge arrester module according to the second embodiment are similar and the main differences therebetween lies in the way in which the rods 302 of the surge arrester module 10 according to the third embodiment are attached to the electrodes 200. The differences between the two embodiments will be described below, and the similarities therebetween will be omitted.

As shown in FIGS. 5 and 6A, the surge arrester module 10 according to the third embodiment includes a varistor stack 100, a pair of electrodes 200 and a coupling assembly 300. The varistor stack 100 includes multiple varistor blocks 102 stacked along a longitudinal direction of the surge arrester module 10. The pair of electrodes 200 are configured for sandwiching the varistor stack 100 therebetween in the longitudinal direction of the surge arrester module 10. Each electrode 200 includes at least one receiving hole 202. The coupling assembly 300 is configured for coupling the pair of electrodes 200 and holding the pair of electrodes 200 and the varistor stack 100 together. The coupling assembly 300 includes at least one rod 302. Each rod 302 includes a rod body 304 and at least one sleeve 306. The rod body 304 extends in the longitudinal direction of the surge arrester module 10 and into the receiving holes 202 of the electrodes 200. The rod body 304 is made of insulating material and includes a first interlocking portion 308. The at least one sleeve 306 is sleeved outside the rod body 304 for attaching the rod 302 to the electrode 200. The sleeve 306 is made of metal and includes a second interlocking portion 310. The second interlocking portion 310 is adapted to fit with the first interlocking portion 308 for preventing relative movement of the rod body 304 and the sleeve 306 in the longitudinal direction of the surge arrester module 10.

As shown in FIGS. 5 and 6A, the varistor stack 100 may include multiple substantially circular cylindrically shaped varistor blocks 102. The varistor stack 100 may also include one or more circular metal plates 104 of electrically conductive material to compensate the space between the varistor blocks 102 and to mechanically reinforce the surge arrester module 10. As shown in FIG. 6A, three metal plates 104 are respectively arranged at opposite ends of the varistor stack 100, with two metal plates at the upper end of the varistor stack 100 and one metal plate at the lower end of the varistor stack 100.

As shown in FIGS. 6A and 7, each electrode 200 may be substantially cylindrically shaped. Each electrode 200 includes a first surface 210 and a second surface 212 which are opposite in the longitudinal direction of the surge arrester module 10 with the first surface 210 facing the varistor stack 100. In the illustrated embodiment, the first surface 210 and the second surface 212 are planar and extends perpendicularly to the longitudinal direction of the surge arrester module 10.

In the illustrated embodiment, each electrode 200 includes multiple receiving holes 202 for receiving the rods 302. Each electrode 200 may also include multiple fastening holes 208, with one fastening hole 208*a* for fastening the surge arrester module 10 to an adjacent surge arrester module 10 and other fastening holes 208*b* for fastening a shield to the surge arrester module 10, as shown in FIGS. 5 and 8. In the illustrated embodiment, each receiving hole 202 is in the form of a through-hole and extends from the first surface 210 to the second surface 212. It should be understood that, in another embodiments, the receiving hole 202 may also be a blind hole.

As shown in FIG. 5, the coupling assembly 300 includes multiple rods 302 arranged evenly spaced from each other around the periphery of the varistor stack 100. In the illustrated embodiment, as shown in FIG. 6B, each rod 302 includes a rod body 304 and two sleeves 306. The rod body

304 includes two end portions 312 opposite to each other and a middle portion 314 extending between the two end portions 312. The two sleeves 306 are respectively sleeved outside the two end portions 312 of the rod body 304 for attaching the rod 302 to the pair of electrodes 200.

In the illustrated embodiment, the first interlocking portion 308 of the rod body 304 is in the form of a circumferential groove, and the second interlocking portion 310 of the sleeve 306 is in the form of a circumferential protrusion.

In the illustrated embodiment, each sleeve 306 may include a tubular body 320 and a shoulder 322 extending radially outward from the tubular body 320. The tubular body 320 of each sleeve 306 is circumferentially crimped to the rod body 304, such that circumferential part(s) of the tubular body 320 is embedded into the first interlocking portion 308 and forms the second interlocking portion 310.

As shown in FIG. 7, each receiving hole 202 includes a first receiving portion 214 for receiving the shoulder 322 of the sleeve 306, and a second receiving portion 216 for receiving the tubular body 320 of the sleeve 306. The first receiving portion 214 has a larger inner dimension than the second receiving portion 216.

In the illustrated embodiment, each receiving hole 202 includes an abutting surface 218. The abutting surface 218 is configured for abutting against the shoulder 322 (for example, the bottom surface of the shoulder 322) for preventing relative movement of the sleeve 306 and the electrode 200 in the longitudinal direction of the surge arrester module 10. The abutting surface 218 may be in form of a stepped surface formed between the first receiving portion 214 and the second receiving portion 216.

In the illustrated embodiment, each receiving hole 202 opens radially outward, allowing the rod 302 to be radially inserted into the receiving hole 202. Each receiving hole 202 further includes a limiting surface 220 configured for abutting against the shoulder 322 of the sleeve 306 (for example, the outer circumferential surface of the shoulder 322), to prevent the sleeve 306 and thus the pull rod 302 from being slipped away from the electrode 200 in a radial direction of the surge arrester module 10, which is particularly advantageous in the case of thermal expansion of the varistor stack 100 during, for example, a short-circuit test.

As shown in FIG. 6A, the surge arrester module 10 may further include an electrical contact element 400 for keeping contact pressure between the varistor blocks 102. In the illustrated embodiment, the electrical contact element 400 is in the form of a screw, such as a set screw. In the illustrated embodiment, the fastening hole 208*a* is in form of a threaded hole. The electrical contact element 400 is provided with external threads and threadedly connected with the threaded hole 208*a*, with an end of the electrical contact element 400 abutting against the metal plate 104 at the top of the varistor stack 100. The electrical contact element 400 may be displaced relative to the electrode 200 in the longitudinal direction of the surge arrester module 10 to press the metal plate 104 and thus keep contact pressure between the varistor blocks 102. The threaded hole 208*a* may be located in the center of the electrode 200, such that the varistor blocks 102 are evenly pressed.

An exemplary assembly process of the surge arrester module 10 of the third embodiment will be described below referring to FIGS. 5-7.

The varistor stack 100 may be first sandwiched between the pair of the electrodes 200. And the pair of electrodes 200 may be adjusted such that the receiving holes 202 of one electrode 200 are aligned with the receiving holes 202 of the other electrode 200. Then, the rods 302 may be arranged around the varistor stack 100, with opposite ends of each rod 302 inserted into corresponding receiving holes 202 of the pair of the electrodes 200. After that, the electrical contact element 400 may be displaced toward the varistor stack 100, and the distance between the pair of electrodes 200 would gradually increase. At last, the shoulder 322 and the tubular body 320 of each sleeve 306 would be respectively received in the first receiving portion 214 and the second receiving portion 216 of a corresponding receiving hole 202 with the bottom surface of the shoulder 322 abutting against the abutting surface 218 of the receiving hole 202, and each rod 302 would be tensioned and the electrodes 200 and the varistor stack 100 would be held together.

Compared to a surge arrester module with its rods attached to the electrodes by multiple nuts, the surge arrester module 10 of the third embodiment is easier to assemble due to less operation of threaded connection, and the varistor stack 100 can be pressed more evenly.

FIG. 8 shows a surge arrester 1 according to the present application. The surge arrester 1 may include at least one surge arrester module 10 and a housing 12 accommodating the at least one surge arrester module 10. The housing 12 may be made of polymer, porcelain or metal. The surge arrester 1 may be applied to a gas-insulated switchgear or other electric devices.

In case that the surge arrester 1 is applied to a gas-insulated switchgear, when the operating voltage in the switchgear is so high that a single surge arrester module is not capable of resisting the operating voltage, the surge arrester 1 may include two or more surge arrester modules 10 connected in series.

Referring to FIGS. 6A and 8, in illustrated embodiment, the surge arrester 1 includes two surge arrester modules 10 connected in series, with the upper surge arrester module 10 provided with a shield 14. In illustrated embodiment, the second surface 212 of each electrode 200 is planar and the ends of each rod 302 are entirely received in the receiving holes 202 of the electrodes 200, which allows second surfaces 212 of adjacent electrodes 200 of the two adjacent surge arrester modules 10 connected in series contact with each other and thus allows a more compact combination of surge arrester modules 10.

The technical content and technical features of the present disclosure have been disclosed above. However, it is conceivable that, under the creative ideas of the present disclosure, those skilled in the art can make various changes and improvements to the concepts disclosed above, but these changes and improvements all belong to the protection scope of the present disclosure. The description of the above embodiments is exemplary rather than limiting, and the protection scope of the present disclosure is defined by the appended claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the disclosure. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this disclosure belongs. The materials, methods, and examples are illustrative only and not intended to be limiting. To the extent that certain details regarding specific materials and processing acts are not described, such details may include conventional approaches, which may be found in reference books and other sources within the manufacturing arts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A surge arrester module comprising:

a varistor stack comprising a plurality of varistor blocks stacked along a longitudinal direction of the surge arrester module;

a pair of electrodes configured for sandwiching the varistor stack therebetween in the longitudinal direction, each electrode comprising at least one receiving hole; and a coupling assembly configured for coupling the pair of electrodes and holding the pair of electrodes and the varistor stack together, the coupling assembly comprising at least one rod, each rod comprising:

a rod body extending in the longitudinal direction and extending into the receiving holes of the pair of electrodes, the rod body being made of insulating material and comprising a first interlocking portion in the form of a circumferential groove, wherein the groove lies within a plane having a normal vector parallel to the longitudinal direction;

at least one sleeve being sleeved outside the rod body for attaching the rod to the electrodes, the sleeve being made of metal and comprising a second interlocking portion, the second interlocking portion in the form of a circumferential protrusion being adapted to fit with the first interlocking portion for preventing relative movement of the rod body and the sleeve in the longitudinal direction, and wherein the coupling assembly further comprises at least one nut and wherein the sleeve is threadedly connected to the nut.

2. The surge arrester module of claim 1, wherein the sleeve is circumferentially crimped to the rod body, and circumferential part of the sleeve is deformed due to crimping to form the second interlocking portion.

3. The surge arrester module of claim 1, wherein the sleeve comprises at least one slot configured for allowing at least a part of the sleeve comprising the second interlocking portion to be elastically deformed in order to fit with the first interlocking portion.

4. The surge arrester module of claim 1, wherein the surge arrester module further comprises an electrical contact element for keeping contact pressure between the varistor blocks.

5. The surge arrester module of claim 4, wherein the electrical contact element is in the form of a spring element, and the electrical contact element is arranged between one of the pair of electrodes and the varistor stack.

6. The surge arrester module of claim 4, wherein the electrical contact element is in the form of a screw, and the electrical contact element is threadedly connected to a threaded hole in one of the pair of electrodes with an end of the electrical contact element abutting against the varistor stack.

7. The surge arrester module of claim 1, wherein the coupling assembly comprises a plurality of rods arranged around the varistor stack.

8. A surge arrester comprising:

at least one surge arrester module of claim 1; and a housing accommodating the at least one surge arrester module.

* * * * *